United States Patent
Li et al.

(10) Patent No.: US 8,736,238 B2
(45) Date of Patent: May 27, 2014

(54) BUCK AND BUCK/BOOST CONVERTER SYSTEMS HAVING AUXILIARY CIRCUITS AND METHOD THEREOF

(75) Inventors: Fei Li, Shanghai (CN); Hongjian Gan, Shanghai (CN); Fei Ji, Shanghai (CN); Xin Li, Shanghai (CN)

(73) Assignee: Delta Electronics, Inc. (TW)

( * ) Notice: Subject to any disclaimer, the term of this patent is extended or adjusted under 35 U.S.C. 154(b) by 417 days.

(21) Appl. No.: 12/925,336

(22) Filed: Oct. 19, 2010

(65) Prior Publication Data

US 2011/0122662 A1    May 26, 2011

(30) Foreign Application Priority Data

Oct. 21, 2009   (TW) ................................ 98135680 A

(51) Int. Cl.
  *H02M 3/02*   (2006.01)
(52) U.S. Cl.
  USPC .............................. 323/229; 307/29; 307/109
(58) Field of Classification Search
  CPC ............................................. H02M 2001/0096
  USPC ............... 323/229, 233, 299; 307/23, 29, 109
  See application file for complete search history.

(56) References Cited

U.S. PATENT DOCUMENTS

| | | | | |
|---|---|---|---|---|
| 6,043,705 A | * | 3/2000 | Jiang | 327/589 |
| 6,504,497 B2 | * | 1/2003 | Jang et al. | 341/125 |
| 6,621,253 B2 | * | 9/2003 | Mendenhall | 323/210 |
| 6,642,632 B2 | * | 11/2003 | Lucas et al. | 307/64 |
| 7,061,212 B2 | * | 6/2006 | Phadke | 323/222 |
| 8,247,922 B2 | * | 8/2012 | Ger et al. | 307/17 |
| 2003/0015998 A1 | | 1/2003 | Takahashi | |
| 2009/0097286 A1 | * | 4/2009 | Lin et al. | 363/65 |
| 2010/0080026 A1 | * | 4/2010 | Zhang | 363/89 |
| 2011/0175590 A1 | * | 7/2011 | Yu et al. | 323/311 |

FOREIGN PATENT DOCUMENTS

| | | |
|---|---|---|
| CN | 1568124 | 1/2005 |
| CN | 1790884 | 6/2006 |
| CN | 101073197 A | 11/2007 |
| JP | 2010263773 A * | 11/2010 |

* cited by examiner

*Primary Examiner* — Harry Behm
(74) *Attorney, Agent, or Firm* — Law Offices of John A. Parrish

(57) ABSTRACT

The configurations of a buck type and a buck/boost type converter systems and a controlling method thereof are provided in the present invention. The proposed buck/boost type converter system includes a rectifier bridge, a first auxiliary circuit including a first unidirectional switch coupled to the rectifier bridge and a second unidirectional switch coupled to the first unidirectional switch, a first capacitor coupled to the first unidirectional switch and the rectifier bridge, a buck/boost converter having a first input terminal coupled to the first unidirectional switch, a second input terminal coupled to the first capacitor, a first output terminal coupled to the second unidirectional switch and a second output terminal, a second capacitor electrically connected to the first and the second output terminals in parallel, and a DC source coupled to the second unidirectional switch.

19 Claims, 7 Drawing Sheets

BUCK AND BUCK/BOOST CONVERTER SYSTEMS HAVING AUXILIARY CIRCUITS AND METHOD THEREOF

FIELD OF THE INVENTION

The present invention relates to a converter (or a power factor correction (PFC) circuit) system having a first auxiliary circuit and reducing a voltage and a controlling method thereof. More particularly, it relates to a buck converter (or a PFC circuit) system having a first auxiliary circuit or a buck/boost converter (or a PFC circuit) system having a first auxiliary circuit.

BACKGROUND OF THE INVENTION

FIG. 1 shows a circuit diagram of a boost type converter in the prior art. In the configuration of boost type converter of FIG. 1, it includes a rectifier bridge (bridge) having four unidirectional switches (e.g., four diodes), a first output terminal and a second output terminal, and a boost converter (or a boost PFC). The rectifier bridge receives an AC input voltage Vin, and the boost converter includes a power switch S having a first and a second terminals, an inductor L having a first and a second terminals, a unidirectional switch D having first terminal and a second terminal (e.g., a diode having an anode and a cathode), and an output capacitor C having a first and a second terminals and outputting a DC voltage Vo. The first terminal of the power switch S is coupled to the second terminal of the inductor L and the first terminal of the unidirectional switch D, the second terminal of the power switch S is coupled to the second output terminal of the rectifier bridge and the second terminal of the output capacitor C, the first terminal of the inductor L is coupled to the first output terminal of the rectifier bridge, and the first terminal of the output capacitor C is coupled to the second terminal of the unidirectional switch D. The AC input voltage Vin stores an energy in the inductor L when the power switch S is turned on, the AC input voltage Vin provides the output power and the energy stored in the inductor L is also transmitted to the load when the power switch S is turned off.

FIG. 2 shows a circuit diagram of a buck type converter in the prior art. In the configuration of buck type converter of FIG. 2, it includes a rectifier bridge (bridge) having four unidirectional switches (e.g., four diodes), a first output terminal and a second output terminal, and a buck converter (or a buck PFC). The rectifier bridge also receives an AC input voltage Vin, and the buck converter includes a power switch S having a first and a second terminals, an inductor L having a first and a second terminals, a unidirectional switch D having a first terminal and a second terminal (e.g., a diode having an anode and a cathode), and an output capacitor C having a first and a second terminals and outputting a DC voltage Vo too. But, the connection relationships in FIG. 2 are different from those of the boost converter in FIG. 1. In FIG. 2, the first terminal of the power switch S is coupled to the first output terminal of the rectifier bridge, the second terminal of the power switch S is coupled to the first terminal of the inductor L and the second terminal of the unidirectional switch D, the first terminal of the unidirectional switch D is coupled to the second output terminal of the rectifier bridge and the second terminal of the output capacitor C, and the second terminal of the inductor L is coupled to the first terminal of the output capacitor C. The AC input voltage Vin provides the output power and stores an energy in the inductor L when the power switch S is turned on, and the energy stored in the inductor L is transmitted to the load when the power switch S is turned off.

FIG. 3 shows a circuit diagram of a buck/boost type converter in the prior art. In the configuration of buck/boost type converter of FIG. 3, it includes a rectifier bridge (bridge) having four unidirectional switches (e.g., four diodes), a first output terminal and a second output terminal, and a buck/boost converter (or a buck/boost PFC). The rectifier bridge also receives an AC input voltage Vin, and the buck/boost converter includes a first and a second power switches S1 and S2, each of which has a first and a second terminals, an inductor L having a first and a second terminals, a first and a second unidirectional switches D1 and D2, each of which has a first terminal and a second terminal (e.g., two diodes, each of which has an anode and a cathode), and an output capacitor C having a first and a second terminals and outputting a DC voltage Vo too. The first terminal of the first power switch S1 is coupled to the first output terminal of the rectifier bridge, the second terminal of the first power switch S1 is coupled to the first terminal of the inductor L and the second terminal of the first unidirectional switch D1, the first terminal of the first unidirectional switch D1 is coupled to the second output terminal of the rectifier bridge, the second terminal of the second power switch S2, and the second terminal of the output capacitor C, the second terminal of the inductor L is coupled to the first terminal of the second unidirectional switch D2 and the first terminal of the second power switch S2, and the second terminal of the second unidirectional switch D2 is coupled to the first terminal of the output capacitor C. The buck/boost converter can be viewed as the aforementioned buck and boost converters connected in series. The buck/boost converter operates in the buck mode, the power switch S2 is continuously turned off, and the unidirectional switch D2 is continuously turned on when the input voltage Vin (after its rectification) is larger than the output voltage Vo. The buck/boost converter operates in the boost mode, the power switch S1 is continuously turned on, and the unidirectional switch D1 is continuously turned off when the input voltage Vin (after its rectification) is less than the output voltage Vo.

The buck type and buck/boost type converters can be set such that the output voltage Vo is smaller than the input voltage Vin (after its rectification). Due to that input voltage Vin (after its rectification) is approximated to the output voltage Vo, the efficiency of the converter can be raised effectively when the input voltage is low. Besides, the design flexibility of the DC/DC converters is increased following the decrease of the output voltage Vo.

But, the buck type and buck/boost type converters also have their drawbacks described as follows.

1. Due to the control of the turn-on and the turn-off of the respective power switch S (S1) of the buck type and buck/boost type converter, a quite large impulse energy is released to the two terminals of the power switch S (S1) once the power switch S (S1) is turned off, and a very high peak switch current is generated and might cause the damage of the power switch when the AC input voltage exceeds an overvoltage threshold.

2. Usually, the buck type and buck/boost type converter is not operated to decrease the standby power consumption of the power source and the power switch S (S1) is turned off when the power source of desk-top computer/server is operated under a standby mode. If the standby power source is connected after the buck type and buck/boost type converter, then it can not be operated normally at this time. If the standby power source is connected after the rectifier bridge, then the standby power source can not maintained a normal output voltage for a predetermined time.

To solve the above-mentioned problem, configurations employed the buck type and buck/boost type converters are proposed in the present invention.

Keeping the drawbacks of the prior arts in mind, and employing experiments and research full-heartily and persistently, the applicants finally conceived buck and, buck/boost converter systems having auxiliary circuits and method thereof.

SUMMARY OF THE INVENTION

It is therefore an object of the present invention to provide a converter system having a first and a second auxiliary circuits and decreasing a voltage, an input impulse signal flows through the first auxiliary circuit, an impulse energy is absorbed by the second auxiliary circuit such that the power switch of the system can be saved from damage when an AC input voltage exceeds an overvoltage threshold, and the energy stored in the second auxiliary circuit is provided to a DC power source so as to keep an output of the DC power source at a normal voltage for a predetermined time when the AC input voltage of the system enters a power saving mode.

According to the first aspect of the present invention, a converter system includes a bridge rectifier having a first and a second output terminals, receiving an AC input voltage and outputting a rectified DC voltage, a first auxiliary circuit comprising a first unidirectional switch having a first terminal coupled to the first output terminal of the bridge rectifier and a second terminal, and a second unidirectional switch having a first terminal and a second terminal coupled to the second terminal of the first unidirectional switch, a storing and absorbing circuit having a first terminal coupled to the second terminal of the first unidirectional switch and a second terminal coupled to the second output terminal of the bridge rectifier, a first capacitor having a first terminal coupled to the first terminal of the second unidirectional switch and a second terminal, a converter circuit having a first input terminal coupled to the first terminal of the first unidirectional switch, a second input terminal coupled to the second output terminal of the bridge rectifier, a first output terminal coupled to the first terminal of the second unidirectional switch and a second output terminal, wherein the first and the second output terminals are coupled to the first capacitor in parallel, and a DC power source having a first input terminal coupled to the second terminal of the second unidirectional switch and a second input terminal coupled to the second output terminal of the bridge rectifier.

Preferably, the storing and absorbing circuit is a second capacitor having a first terminal and a second terminal.

Preferably, the storing and absorbing circuit is a second auxiliary circuit and comprises a third, a fourth and a fifth unidirectional switches, each of which has a first terminal and a second terminal, a second and a third capacitors, each of which has a first and a second terminals, the second terminal of the fourth unidirectional switch is coupled to the first terminal of the third unidirectional switch, the first terminal of the fourth unidirectional switch is coupled to the second terminal of the fifth unidirectional switch, the second terminal of the third capacitor is coupled to the first terminal of the fourth unidirectional switch and the second terminal of the fifth unidirectional switch, the first terminal of the third capacitor is coupled to the second terminal of the third unidirectional switch, the first terminal of the fifth unidirectional switch is coupled to the second terminal of the second capacitor, and the first terminal of the second capacitor is coupled to the first terminal of the third unidirectional switch and the second terminal of the fourth unidirectional switch.

Preferably, the system further comprises an EMI filter and a DC/DC converter having a first and a second input terminals and an output terminal, wherein the first capacitor is an output capacitor, the converter circuit outputs a DC bus voltage, the DC power source is a standby power source and has an output terminal outputting a standby voltage, the bridge rectifier further comprises a first and a second input terminals, the EMI filter receives the AC input voltage and is coupled to the first and the second input terminals of the bridge rectifier in parallel, the first and the second input terminals of the DC/DC converter are respectively coupled to the first terminal of the second unidirectional switch and the second output terminal of the converter circuit, and receive the DC bus voltage, and the output terminal of the DC/DC converter outputs a DC output voltage.

Preferably, the bridge rectifier further comprises a third to a sixth unidirectional switches, each of which has a first terminal and a second terminal, the first terminal of the third unidirectional switch and the second terminal of the fourth unidirectional switch are coupled at the first input terminal of the bridge rectifier, the second terminal of the third unidirectional switch and the second terminal of the fifth unidirectional switch are coupled at the first output terminal of the bridge rectifier, the first terminal of the fourth unidirectional switch and the first terminal of the sixth unidirectional switch are coupled at the second output terminal of the bridge rectifier, and the first terminal of the fifth unidirectional switch and the second terminal of the sixth unidirectional switch are coupled at the second input terminal of the bridge rectifier.

Preferably, the converter circuit is a buck converter, the buck converter further comprises a power switch having a first and a second terminals, a third unidirectional switch having a first terminal and a second terminal and an inductor having a first and a second terminals, the first terminal of the power switch is coupled to the first input terminal of the buck converter, the second terminal of the third unidirectional switch is coupled to the second terminal of the power switch and the first terminal of the inductor, the first terminal of the third unidirectional switch is coupled to the second input terminal and the second output terminal of the buck converter, and the second terminal of the inductor is coupled to the first output terminal of the buck converter.

Preferably, there is an input impulse signal flowing through the first unidirectional switch and the storing and absorbing circuit when the AC input voltage is the input impulse signal and exceeds an overvoltage threshold such that the input impulse signal has an impulse energy, the impulse energy is absorbed by the storing and absorbing circuit, and the rectified DC voltage is clamped at a first predetermined value so as to clamp a voltage peak value of the power switch low than a second predetermined value to avoid a damage of the power switch.

Preferably, the storing and absorbing circuit has an energy stored therein and the energy is provided to the DC power source via the second unidirectional switch when the AC input voltage enters a power saving mode such that the DC power source could keep an output at a normal voltage for a predetermined time.

Preferably, the converter circuit is a buck/boost converter, the buck/boost converter further comprises a first and a second power switches, each of which has a first and a second terminals, a third and a fourth unidirectional switches, each of which has a first terminal and a second terminal, and an inductor having a first and a second terminals, the first terminal of the first power switch is coupled to the first input terminal of the buck/boost converter, the second terminal of the third unidirectional switch is coupled to the second terminal of the first power switch and the first terminal of the inductor, the first terminal of the third unidirectional switch is coupled to the second input terminal of the buck/boost converter and the second terminal of the second power switch, the first terminal of the second power switch is coupled to the second terminal of the inductor and the first terminal of the fourth unidirectional switch, the second terminal of the second power switch is coupled to the second output terminal of the buck/boost converter, and the second terminal of the fourth unidirectional switch is coupled to the first output terminal of the second terminal of the buck/boost converter.

Preferably, there is an input impulse signal flowing through the first unidirectional switch and the storing and absorbing circuit when the AC input voltage is the input impulse signal and exceeds an overvoltage threshold such that the input impulse signal has an impulse energy being absorbed by the storing and absorbing circuit, and the rectified DC voltage is clamped at a first predetermined value so as to clamp a voltage peak value of the first power switch being lower than a second predetermined value to avoid a damage of the first power switch.

Preferably, there is an energy stored in the first capacitor and the energy is provided to the DC power source via the second unidirectional switch when the AC input voltage enters a power saving mode such that the DC power source could keep an output at a normal voltage for a predetermined time.

According to the second aspect of the present invention, a converter system includes a bridge rectifier having a first and a second output terminals, receiving an AC input voltage and outputting a rectified DC voltage, a first auxiliary circuit including a first unidirectional switch having a first terminal coupled to the first output terminal of the bridge rectifier and a second terminal, and a second unidirectional switch having a first terminal and a second terminal coupled to the second terminal of the first unidirectional switch, a first capacitor having a first terminal coupled to the second terminal of the first unidirectional switch and a second terminal coupled to the second output terminal of the bridge rectifier, a second capacitor having a first terminal coupled to the first terminal of the second unidirectional switch and a second terminal, a converter circuit having a first input terminal coupled to the first terminal of the first unidirectional switch, a second input terminal coupled to the second output terminal of the bridge rectifier, a first output terminal coupled to the first terminal of the second unidirectional switch and a second output terminal, wherein the first and the second output terminals are coupled to the second capacitor in parallel, and a DC power source having a first input terminal coupled to the second terminal of the second unidirectional switch and a second input terminal coupled to the second output terminal of the bridge rectifier.

Preferably, the system further comprises an EMI filter and a DC/DC converter having a first and a second input terminals and an output terminal, wherein the first capacitor is an absorbing and storing capacitor, the second capacitor is an output capacitor, the converter circuit outputs a DC bus voltage, the DC power source is a standby power source and has an output terminal outputting a standby voltage, the bridge rectifier further comprises a first and a second input terminals, the EMI filter receives the AC input voltage and is coupled to the first and the second input terminals of the bridge rectifier in parallel, the first and the second input terminals of the DC/DC converter are respectively coupled to the first terminal of the second unidirectional switch and the second output terminal of the converter circuit, and receive the DC bus voltage, and the output terminal of the DC/DC converter outputs a DC output voltage.

According to the third aspect of the present invention, a controlling method for a converter system, wherein the converter system comprises a first auxiliary circuit having a first unidirectional switch, a storing and absorbing circuit coupled to the first auxiliary circuit and a DC power source coupled to the storing and absorbing circuit, includes the steps of: (a) providing an AC input voltage of the converter system; (b) causing an input impulse signal flowing through the first unidirectional switch and the storing and absorbing circuit when the AC input voltage is the input impulse signal and exceeds an overvoltage threshold; and (c) providing an energy to the DC power source when the AC input voltage enters a power saving mode.

Preferably, the converter system further comprises a rectifier bridge coupled to the first auxiliary circuit and the storing and absorbing circuit and outputting a rectified DC voltage and a converter circuit coupled to the rectifier bridge and reducing a voltage and having a power switch, and the step (b) further comprises the steps of (b1) absorbing an impulse energy from the input impulse signal by the storing and absorbing circuit; (b2) clamping the rectified DC voltage at a first predetermined value; and (b3) clamping a voltage peak value of the power switch at a second predetermined value to avoid a damage of the power switch.

Preferably, the converter circuit is one of a buck converter and a buck/boost converter.

Preferably, the first auxiliary circuit comprises the first unidirectional switch having a first terminal coupled to the first output terminal of the bridge rectifier and a second terminal and a second unidirectional switch having a first terminal and a second terminal coupled to the second terminal of the first unidirectional switch, and the converter system further comprises a first capacitor having a first terminal coupled to the first terminal of the second unidirectional switch and a second terminal, and the step (c) further comprises the steps of: (c1) providing an energy stored in the first capacitor to the DC power source via the second unidirectional switch when the AC input voltage enters a power saving mode; and (c2) keeping an output of the DC power source at a normal voltage for a predetermined time when the AC input voltage enters the power saving mode.

Preferably, the storing and absorbing circuit has a first terminal coupled to the second terminal of the first unidirectional switch and a second terminal coupled to the second output terminal of the bridge rectifier, and the step (c) further comprises the steps of: (c1) providing a value of a DC bus voltage outputting from the converter circuit and a peak value of the rectified DC voltage; and (c2) causing a half of the peak value to be less than the value of the DC bus voltage such that the energy is provided by the rectified DC voltage when a value of the rectified DC voltage is no less than the value of the DC bus voltage and the energy is provided by the DC bus voltage when the value of the rectified DC voltage is smaller than the value of the DC bus voltage so as to avoid a peak current of an AC input current of the converter system to be appeared.

Preferably, the storing and absorbing circuit is a second capacitor having a first and a second terminals.

Preferably, the storing and absorbing circuit is a second auxiliary circuit and comprises a third, a fourth and a fifth unidirectional switches, each of which has a first terminal and a second terminal, a second and a third capacitors, each of which has a first and a second terminals, the second terminal of the fourth unidirectional switch is coupled to the first terminal of the third unidirectional switch, the first terminal of the fourth unidirectional switch is coupled to the second terminal of the fifth unidirectional switch, the second terminal of the third capacitor is coupled to the first terminal of the fourth unidirectional switch and the second terminal of the fifth unidirectional switch, the first terminal of the third capacitor is coupled to the second terminal of the third unidirectional switch, the first terminal of the fifth unidirectional switch is coupled to the second terminal of the second capacitor, and the first terminal of the second capacitor is coupled to the first terminal of the third unidirectional switch and the second terminal of the fourth unidirectional switch.

The present invention may best be understood through the following descriptions with reference to the accompanying drawings, in which:

DETAILED DESCRIPTION OF THE PREFERRED EMBODIMENT

Figure 1:
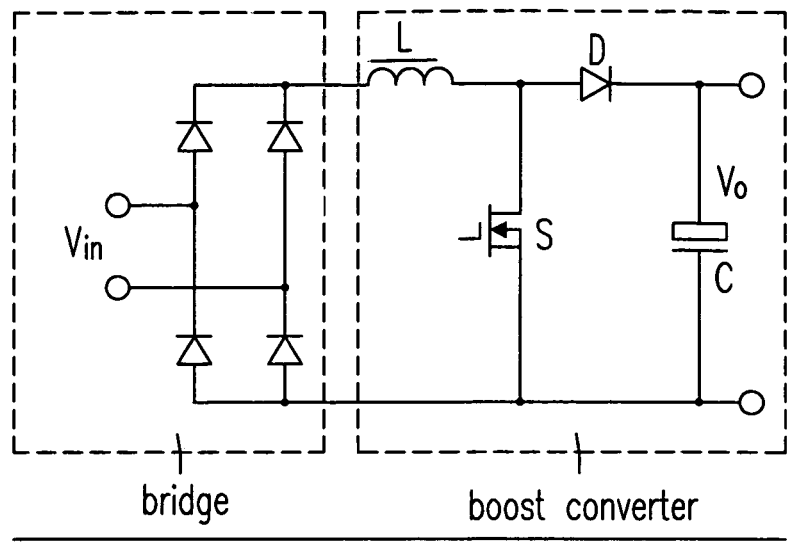
FIG. 1 shows a circuit diagram of a boost type converter in the prior art.
Figure 2:
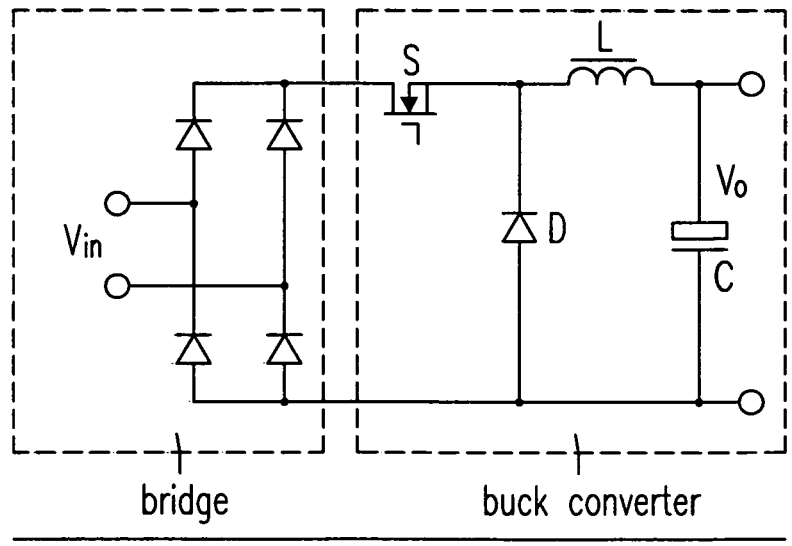
FIG. 2 shows a circuit diagram of a buck type converter in the prior art.
Figure 4:
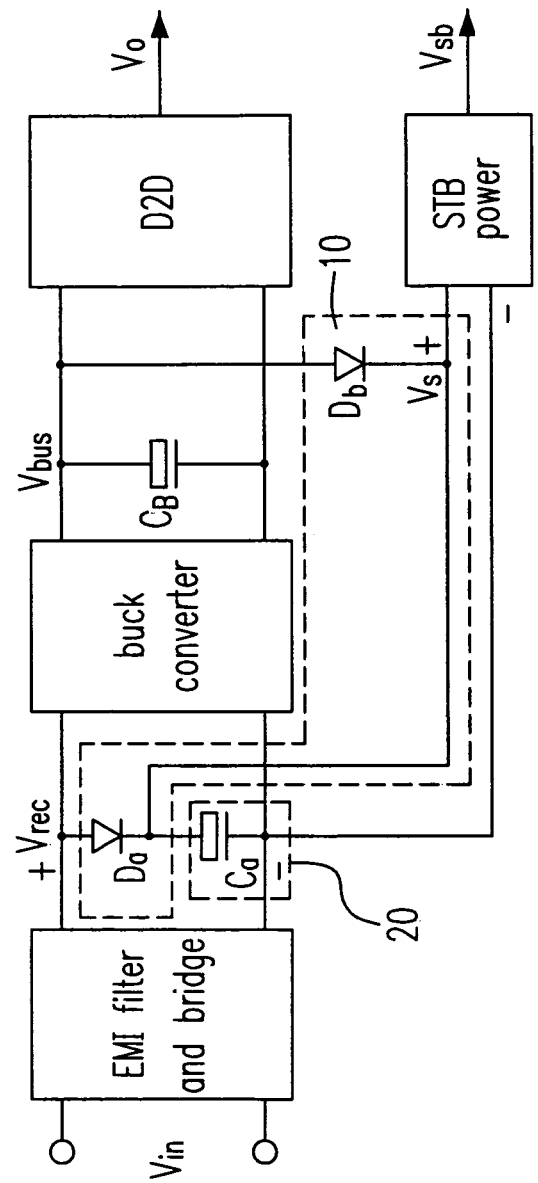
FIG. 4 shows a circuit diagram of a buck type converter system according to the first preferred embodiment of the present invention.

FIG. 4 is a circuit diagram of a buck type converter system according to the first preferred embodiment of the present invention. FIG. 4 shows the configuration of the proposed buck type converter system. In FIG. 4, the buck converter has the same elements and configuration as those of the buck converter in FIG. 2, and the only difference between the two converters is that the output capacitor C in FIG. 2 is replaced by an output capacitor $C_B$ (a first capacitor) in FIG. 4. The input voltage Vin receives by the EMI (electrical magnetic interference) filter and the rectifier bridge (EMI filter and bridge) and is rectified into the voltage Vrec in FIG. 4. The buck converter further converts the voltage Vrec into a DC bus voltage Vbus, and the rear stage DC/DC converter (D2D) realizes the conversion of the output voltage Vo. Each of the EMI filter and the rectifier bridge has a first and a second output terminals and the buck converter has a first and a second input terminals. The first auxiliary circuit 10 includes a first unidirectional switch Da and a second unidirectional switch Db, each of which has a first terminal and a second terminal. The storing and absorbing circuit (a second auxiliary circuit) 20 includes a second capacitor Ca having a first and a second terminals. The first terminal of the first unidirectional switch Da is coupled to the first output terminal of the EMI filter and the rectifier bridge and the first input terminal of the buck converter, the second terminal of the first unidirectional switch Da is coupled to the first terminal of the second capacitor Ca and the second terminal of the second unidirectional switch Db, the second terminal of the second capacitor Ca is coupled to the second output terminal of the EMI filter and the rectifier bridge, the second input terminal of the buck converter and the second input terminal (the negative input terminal) of the standby power source (STB power). The standby power source is a DC power source, its positive input terminal (the first input terminal) is coupled to the second terminal of the second unidirectional switch Db, and its input voltage comes from the voltage across the second capacitor Ca of the storing and absorbing circuit 20.

When the system in FIG. 4 is started, the input voltage Vin is loaded on the EMI filter and the rectifier bridge, and the output voltage of which is Vrec. The voltage Vrec is loaded on the sub-circuit of the first unidirectional switch Da of the first auxiliary circuit 10 and the second capacitor Ca of the storing and absorbing circuit 20, and the second capacitor Ca is charged via the second unidirectional switch Da. When the voltage across the capacitor Ca Vs is built up, the standby power source begins to operate, outputs voltage Vsb, and provides an energy to a control power source of the converter and the DC/DC converter so as to realize the start-up of the circuit.

The input voltage Vin begins to decrease when the input voltage Vin enters a power saving mode, Vrec also begins to decrease by following that since the Ca of the storing and absorbing circuit 20 is a smaller capacitor storing less energy. The output capacitor $C_B$ of the converter is a big capacitor storing more energy, the energy of $C_B$ provides to the standby power source via the second unidirectional switch Db so as to realize the specification of the standby power source of keeping an output at a normal voltage for a predetermined time when the input voltage Vin begins to decrease.

Such a configuration could overcome the drawbacks of peak voltage across the power switch S (S1) of the converter being too high so as to damage the power switch when the buck type and the buck/boost type converters have input voltages exceeding an overvoltage threshold. By employing such a configuration, the input goes through the low impedance loop of Da and Ca, the impulse energy is absorbed by the capacitor Ca so as to clamp the rectified DC voltage at Vrec to guarantee the reliability of the circuit when the power source outputs an input voltage exceeding an overvoltage threshold.

Figure 3:
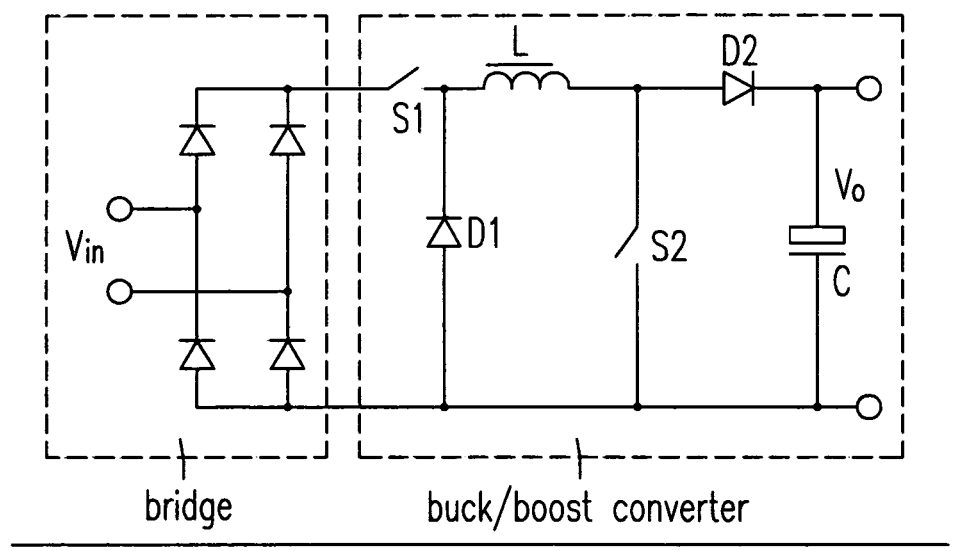
FIG. 3 shows a circuit diagram of a buck/boost type converter in the prior art.
Figure 5:
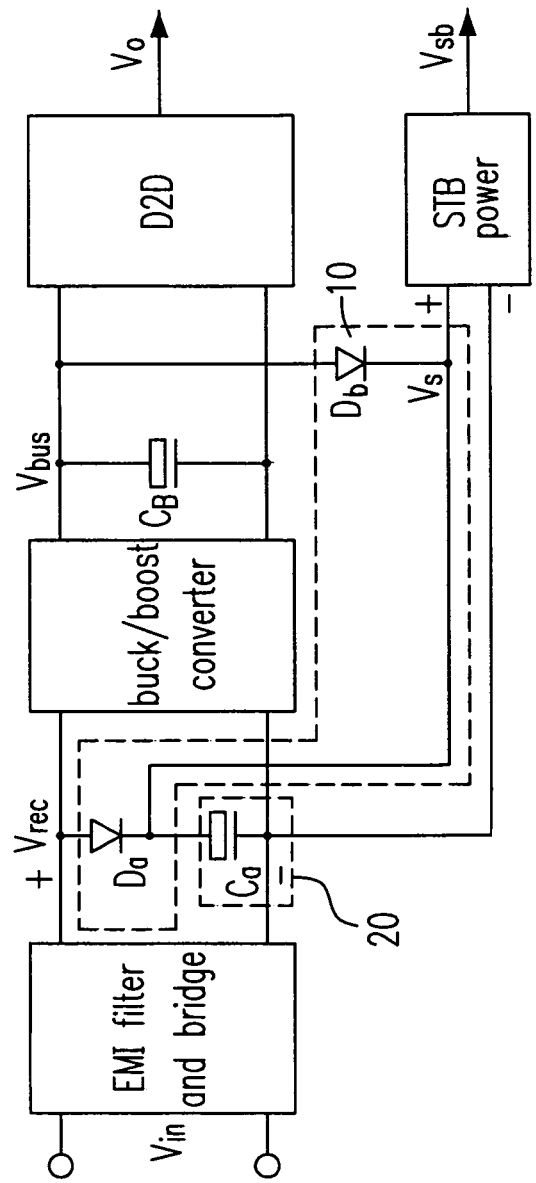
FIG. 5 shows a circuit diagram of a buck/boost type converter system according to the second preferred embodiment of the present invention.

FIG. 5 shows a circuit diagram of a buck/boost type converter system according to the second preferred embodiment of the present invention. The difference between the configuration of the proposed buck/boost converter system in FIG. 5 and that of FIG. 4 is that a buck/boost converter is used instead. The buck/boost converter has the same elements and configuration as those of the buck/boost converter in FIG. 3, and the difference between the two buck/boost converters is also that the output capacitor C of FIG. 3 is replaced by the output capacitor $C_B$ of FIG. 5. The buck/boost converter system of FIG. 5 has the same basic principles as those of the buck converter system of FIG. 4, and the basic principles of which are not mentioned here.

Figure 6:
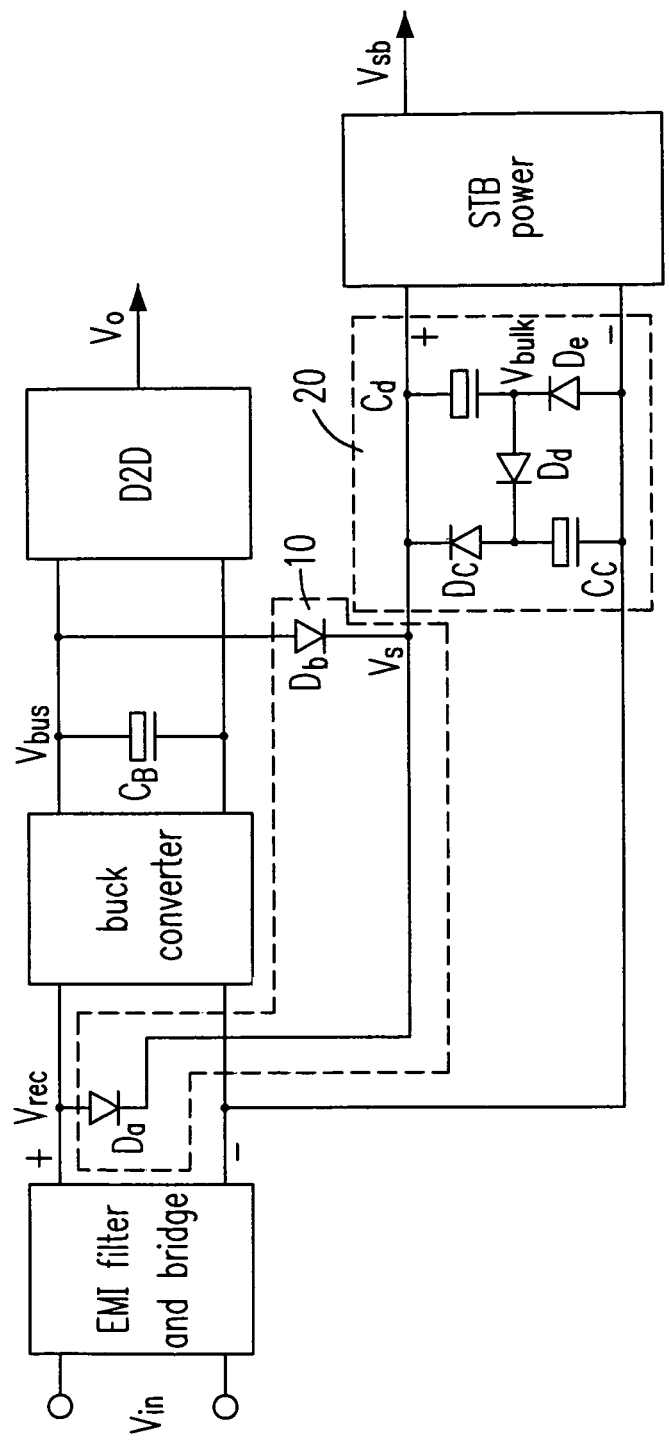
FIG. 6 shows a circuit diagram of a buck type converter system according to the third preferred embodiment of the present invention.

FIG. 6 shows a circuit diagram of a buck type converter system according to the third preferred embodiment of the present invention. The configuration of FIG. 4 is simple, but an AC input current of its converter system might appear a quite high peak current when it is charging the second capacitor Ca, and a configuration in FIG. 6 is proposed to overcome this phenomenon. The difference between the configuration in FIG. 6 and that of FIG. 4 is that the storing and absorbing circuit 20 included in the configuration of FIG. 6 is a second auxiliary circuit used to replace the second capacitor Ca originally included in FIG. 4. This second auxiliary circuit includes a third, a fourth and a fifth unidirectional switches Dc, Dd and De, each of which has a first terminal and a second terminal, and a third and a fourth capacitors Cc and Cd, each of which has a first terminal and a second terminal. The standby power source includes a positive input terminal (a first input terminal) and a negative input terminal (a second input terminal). The second terminal of the third unidirectional switch Dc is coupled to the first terminal of the fourth capacitor Cd and the positive input terminal of the standby power source, the first terminal of the third unidirectional switch Dc is coupled to the first terminal of the third capacitor Cc and the second terminal of the fourth unidirectional switch Dd, the first terminal of the fourth unidirectional switch Dd is coupled to the second terminal of the fourth capacitor Cd and the second terminal of the fifth unidirectional switch De, the second terminal of the third capacitor Cc is coupled to the first terminal of the fifth unidirectional switch De and the negative input terminal of the standby power source, and the negative input terminal of the standby power source is coupled to the respective second terminals of the EMI filter and the rectifier bridge, and the buck converter. The newly proposed second auxiliary circuit 20 has the same functions as Ca (the second auxiliary circuit 20) of FIG. 4, and is further used to avoid a peak current of the AC input current of the converter system to be appeared.

Figure 7:
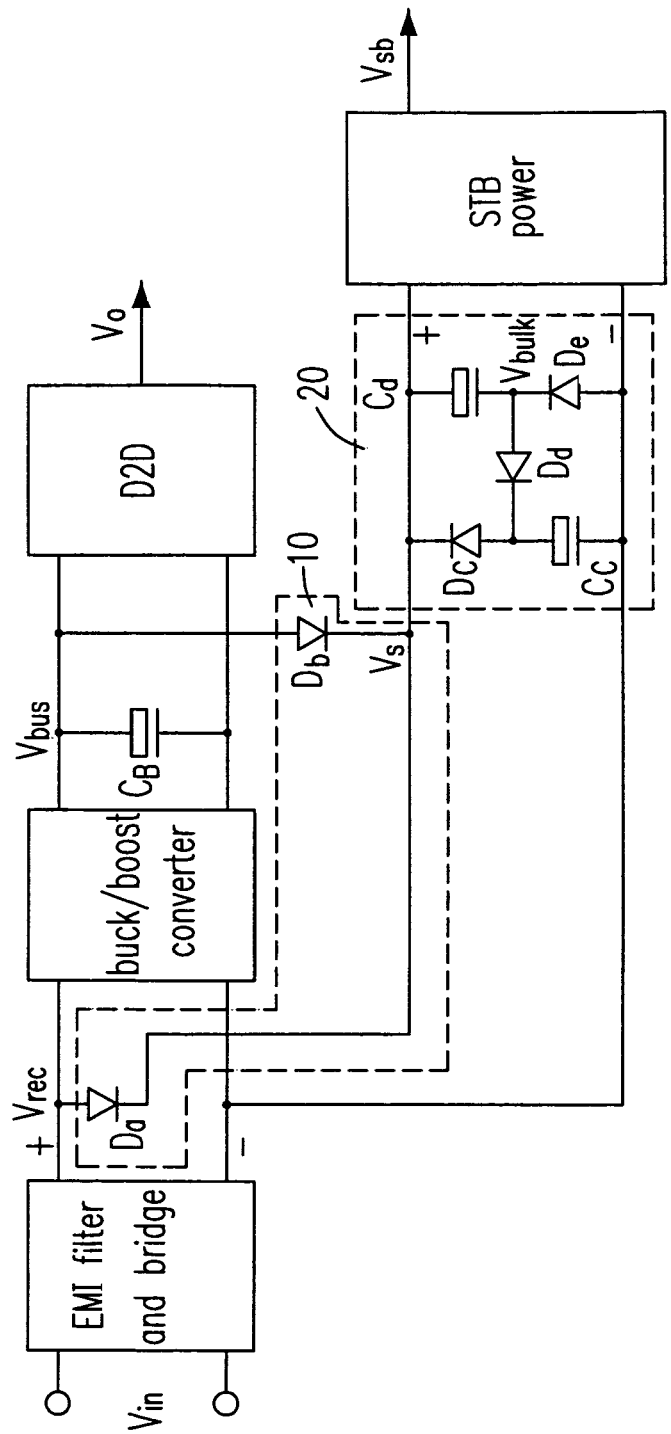
FIG. 7 shows a circuit diagram of a buck/boost type converter system according to the fourth preferred embodiment of the present invention.

FIG. 7 shows a circuit diagram of a buck/boost type converter system according to the fourth preferred embodiment of the present invention. The difference between the configuration of the buck/boost type converter system in FIG. 7 and that of FIG. 6 is that a buck/boost type converter is used. The buck/boost converter of FIG. 7 has the same elements and configuration as those of the buck/boost converter in FIG. 3, and the difference between the two buck/boost converters is also that the output capacitor C of FIG. 3 is replaced by the output capacitor $C_B$ of FIG. 7. The buck/boost converter system of FIG. 7 has the same basic principles as those of the buck converter system of FIG. 6, and these basic principles of which are not mentioned here.

Figure 8:
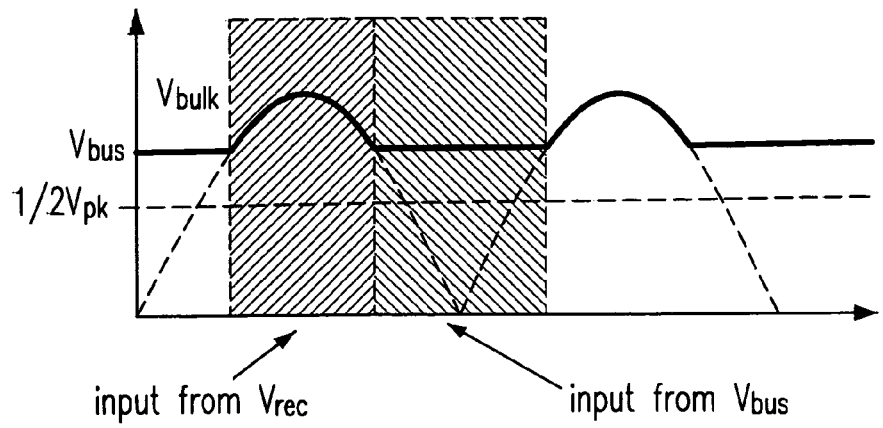
FIG. 8 is a waveform diagram of the input voltage of the standby power source when a half of a peak value of the rectified DC voltage is smaller than a value of the DC bus voltage according to the converter systems of the third and the fourth preferred embodiments of the present invention.

FIG. 8 is a waveform diagram of the input voltage (Vs) of the standby power source when a half of a peak value of the rectified DC voltage is smaller than a value of the DC bus voltage ((½)Vpk≤Vbus) according to the converter systems of the third and the fourth preferred embodiments of the present invention, in which, Vrec is a full-wave rectification wave, Vpk is the peak value of Vrec, and a value of Vpk is higher than that of Vbus. During the procedure that the second auxiliary circuit 20 begins to charge, capacitors Cc and Cd are connected in series via unidirectional switch Dd so as to cause the highest voltage add on the series-connected capacitor circuit (Cc+Cd) being Vpk, that is to say, each capacitor has a voltage of (½)Vpk, the capacitor Cc is connected to the unidirectional switch Dc in series to discharge and the capacitor Cd is connected to the unidirectional switch De in series to discharge during the procedure, in which the second auxiliary circuit 20 (i.e. the storing and absorbing circuit 20 of FIGS. 6 and 7) begins to discharge. The energy of the standby power source is provided by Vrec when Vrec≥Vbus, the energy of the standby power source is provided by Vbus when Vrec<Vbus (Vbulk indicates the shaded areas), and the voltages across each of the capacitors Cc and Cd is (½)Vpk, which is set up when the converter systems according to the third and the fourth preferred embodiments of the present invention are just started, and is less than Vbus, and they can not engaged in discharge during the normal operational procedure of the converter systems according to the third and the fourth preferred embodiments of the present invention. An AC input current of the converter system does not exist the quite high peak current resulting from charging the capacitors Cc and Cd due to that Cc and Cd are not participated in the operation, and this peak current has plenty of high order harmonics which are disadvantageous to the harmonic test of the input current. Thus, according to the design conditions of the third and the fourth preferred embodiments of the present invention, these two converters systems are operated under the condition of (½)Vpk<Vbus.

Figure 9:
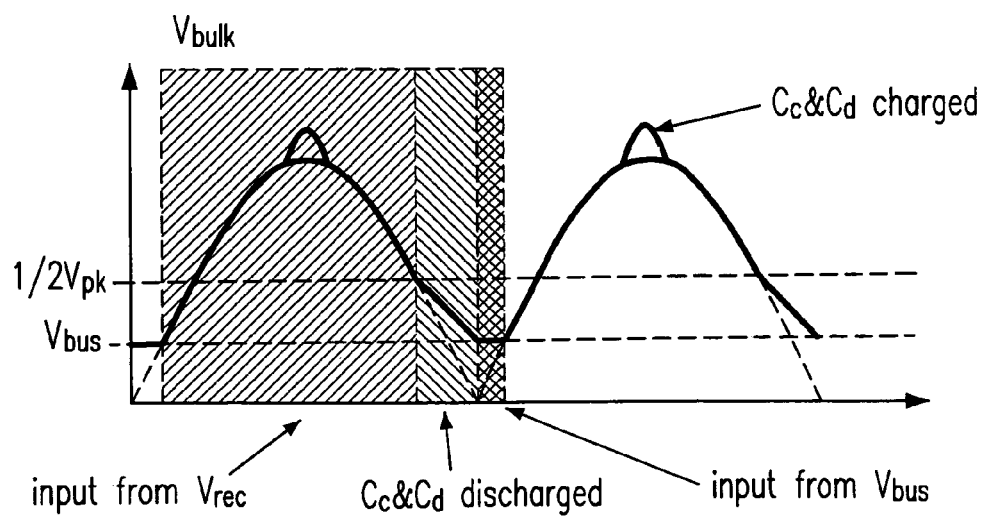
FIG. 9 is a waveform diagram of the input voltage of the standby power source when a half of a peak value of the rectified DC voltage is no less than a value of the DC bus voltage according to the converter systems of the third and the fourth preferred embodiments of the present invention.

FIG. 9 is a waveform diagram of the input voltage (Vs) of the standby power source when a half of a peak value of the rectified DC voltage is no less than a value of the DC bus voltage ((½)Vpk≥Vbus) according to the converter systems of the third and the fourth preferred embodiments of the present invention. As shown in FIG. 9, the energy of the standby power source is provided by Vrec when Vrec≥(½)Vpk, the energy of the standby power source is provided by capacitors Cc and Cd when Vrec<(½)Vpk, and the energy of the standby power source is provided by Vbus when the voltage of Cc or Cd is less than Vbus (Vbulk indicates the shaded areas). Due to that capacitors Cc and Cd are participated in the operation, so that the AC input current of the converter system does exist the quite high peak currents, and each of these peak currents has plenty of high order harmonics which are disadvantageous to the harmonic test of the input current. Thus, according to the design conditions of the third and the fourth preferred embodiments of the present invention, these two converter systems are not operated under the condition of (½)Vpk>Vbus.

According to the aforementioned descriptions, the present invention provides a converter system having a first and a second auxiliary circuits and decreasing a voltage, an input impulse signal flows through the first auxiliary circuit, and an impulse energy is absorbed by the second auxiliary circuit such that the power switch of the system can be saved from damage when an AC input voltage exceeds an overvoltage threshold, and the energy stored in the second auxiliary circuit is provided to a DC power source so as to keep an output of the DC power source at a normal voltage for a predetermined time when an AC input voltage of the system enters a power saving mode, which indeed possesses the non-obviousness and the novelty.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A converter system, comprising:
   a bridge rectifier having first and second input terminals, and first and second output terminals, receiving an AC input voltage and outputting a rectified DC voltage;
   a first auxiliary circuit, comprising:

a first unidirectional switch having a first terminal coupled to the first output terminal of the bridge rectifier and a second terminal; and a second unidirectional switch having a first terminal and a second terminal coupled to the second terminal of the first unidirectional switch;

a storing and absorbing circuit having a first terminal coupled to the second terminal of the first unidirectional switch and a second terminal coupled to the second output terminal of the bridge rectifier;

a first capacitor having a first terminal coupled to the first terminal of the second unidirectional switch and a second terminal;

a converter circuit outputting a DC bus voltage and having a first input terminal coupled to the first terminal of the first unidirectional switch, a second input terminal coupled to the second output terminal of the bridge rectifier, a first output terminal coupled to the first terminal of the second unidirectional switch and a second output terminal, wherein the first and the second output terminals are coupled to the first capacitor in parallel;

an EMI filter receiving the AC input voltage and coupled to the first and the second input terminals of the bridge rectifier in parallel;

a DC/DC converter having a first and a second input terminals, and an output terminal outputting a DC output voltage; and a DC power source having a first input terminal coupled to the second terminal of the second unidirectional switch, a second input terminal coupled to the second output terminal of the bridge rectifier, and an output terminal outputting a standby voltage, wherein the first capacitor is an output capacitor, the DC power source is a standby power source, and the first and the second input terminals of the DC/DC converter are respectively coupled to the first terminal of the second unidirectional switch and the second output terminal of the converter circuit, and receive the DC bus voltage.

2. A system according to claim 1, wherein the storing and absorbing circuit is a second capacitor having first and second terminals.

3. A system according to claim 1, wherein the storing and absorbing circuit is a second auxiliary circuit and comprises a third, a fourth and a fifth unidirectional switches, each of which has a first terminal and a second terminal, a second and a third capacitors, each of which has first and second terminals, the second terminal of the fourth unidirectional switch is coupled to the first terminal of the third unidirectional switch, the first terminal of the fourth unidirectional switch is coupled to the second terminal of the fifth unidirectional switch, the second terminal of the third capacitor is coupled to the first terminal of the fourth unidirectional switch and the second terminal of the fifth unidirectional switch, the first terminal of the third capacitor is coupled to the second terminal of the third unidirectional switch, the first terminal of the fifth unidirectional switch is coupled to the second terminal of the second capacitor, and the first terminal of the second capacitor is coupled to the first terminal of the third unidirectional switch and the second terminal of the fourth unidirectional switch.

4. A system according to claim 1, wherein the bridge rectifier further comprises a third to a sixth unidirectional switches, each of which has a first terminal and a second terminal, the first terminal of the third unidirectional switch and the second terminal of the fourth unidirectional switch are coupled at the first input terminal of the bridge rectifier, the second terminal of the third unidirectional switch and the second terminal of the fifth unidirectional switch are coupled at the first output terminal of the bridge rectifier, the first terminal of the fourth unidirectional switch and the first terminal of the sixth unidirectional switch are coupled at the second output terminal of the bridge rectifier, and the first terminal of the fifth unidirectional switch and the second terminal of the sixth unidirectional switch are coupled at the second input terminal of the bridge rectifier.

5. A system according to claim 1, wherein the converter circuit is a buck converter, the buck converter further comprises a power switch having first and second terminals, a third unidirectional switch having a first terminal and a second terminal and an inductor having first and second terminals, the first terminal of the power switch is coupled to the first input terminal of the buck converter, the second terminal of the third unidirectional switch is coupled to the second terminal of the power switch and the first terminal of the inductor, the first terminal of the third unidirectional switch is coupled to the second input terminal and the second output terminal of the buck converter, and the second terminal of the inductor is coupled to the first output terminal of the buck converter.

6. A system according to claim 5, wherein there is an input impulse signal flowing through the first unidirectional switch and the storing and absorbing circuit when the AC input voltage is the input impulse signal and exceeds an overvoltage threshold such that the input impulse signal has an impulse energy, the impulse energy is absorbed by the storing and absorbing circuit, and the rectified DC voltage is clamped at a first predetermined value so as to clamp a voltage peak value of the power switch lower than a second predetermined value to avoid a damage of the power switch.

7. A system according to claim 5, wherein the first capacitor has an energy stored therein and the energy is provided to the DC power source via the second unidirectional switch when the AC input voltage enters a power saving mode such that the DC power source could keep an output at a normal voltage for a predetermined time.

8. A system according to claim 1, wherein the converter circuit is a buck/boost converter, the buck/boost converter further comprises a first and a second power switches, each of which has first and second terminals, a third and a fourth unidirectional switches, each of which has a first terminal and a second terminal, and an inductor having first and second terminals, the first terminal of the first power switch is coupled to the first input terminal of the buck/boost converter, the second terminal of the third unidirectional switch is coupled to the second terminal of the first power switch and the first terminal of the inductor, the first terminal of the third unidirectional switch is coupled to the second input terminal of the buck/boost converter and the second terminal of the second power switch, the first terminal of the second power switch is coupled to the second terminal of the inductor and the first terminal of the fourth unidirectional switch, the second terminal of the second power switch is coupled to the second output terminal of the buck/boost converter, and the second terminal of the fourth unidirectional switch is coupled to the first output terminal of the buck/boost converter.

9. A system according to claim 8, wherein there is an input impulse signal flowing through the first unidirectional switch and the storing and absorbing circuit when the AC input voltage is the input impulse signal and exceeds an overvoltage threshold such that the input impulse signal has an impulse energy being absorbed by the storing and absorbing circuit, and the rectified DC voltage is clamped at a first predetermined value so as to clamp a voltage peak value of the first power switch being lower than a second predetermined value to avoid a damage of the first power switch.

10. A system according to claim 8, wherein there is an energy stored in the first capacitor and the energy is provided to the DC power source via the second unidirectional switch when the AC input voltage enters a power saving mode such that the DC power source could keep an output at a normal voltage for a predetermined time.

11. A converter system, comprising:
- a bridge rectifier having first and second input terminals, and first and second output terminals, receiving an AC input voltage and outputting a rectified DC voltage;
- a first auxiliary circuit, comprising:
  - a first unidirectional switch having a first terminal coupled to the first output terminal of the bridge rectifier and a second terminal; and
  - a second unidirectional switch having a first terminal and a second terminal coupled to the second terminal of the first unidirectional switch;
- a first capacitor having a first terminal coupled to the second terminal of the first unidirectional switch and a second terminal coupled to the second output terminal of the bridge rectifier;
- a second capacitor having a first terminal coupled to the first terminal of the second unidirectional switch and a second terminal;
- a converter circuit outputting a DC bus voltage and having a first input terminal coupled to the first terminal of the first unidirectional switch, a second input terminal coupled to the second output terminal of the bridge rectifier, a first output terminal coupled to the first terminal of the second unidirectional switch and a second output terminal, wherein the first and the second output terminals are coupled to the second capacitor in parallel;
- an EMI filter receiving the AC input voltage and coupled to the first and the second input terminals of the bridge rectifier in parallel;
- a DC/DC converter having a first and a second input terminals, and an output terminal outputting a DC output voltage; and
- a DC power source having a first input terminal coupled to the second terminal of the second unidirectional switch, a second input terminal coupled to the second output terminal of the bridge rectifier, and an output terminal outputting a standby voltage, wherein the first capacitor is an output capacitor, the DC power source is a standby power source, and the first and the second input terminals of the DC/DC converter are respectively coupled to the first terminal of the second unidirectional switch and the second output terminal of the converter circuit, and receive the DC bus voltage.

12. A system according to claim 11 further comprising an EMI filter and a DC/DC converter having a first and a second input terminals and an output terminal, wherein the first capacitor is an absorbing and storing capacitor, the second capacitor is an output capacitor, the converter circuit outputs a DC bus voltage, the DC power source is a standby power source and has an output terminal outputting a standby voltage, the bridge rectifier further comprises a first and a second input terminals, the EMI filter receives the AC input voltage and is coupled to the first and the second input terminals of the bridge rectifier in parallel, the first and the second input terminals of the DC/DC converter are respectively coupled to the first terminal of the second unidirectional switch and the second output terminal of the converter circuit, and receive the DC bus voltage, and the output terminal of the DC/DC converter outputs a DC output voltage.

13. A controlling method for a converter system, wherein the converter system comprises a rectifier bridge having first and second input terminals, and first and second output terminals, and outputting a rectified DC voltage, a first auxiliary circuit having a first unidirectional switch with a first terminal coupled to the first output terminal of the bridge rectifier and a second terminal, and a second unidirectional switch having a first terminal and a second terminal coupled to the second terminal of the first unidirectional switch, a storing and absorbing circuit having a first terminal coupled to the second terminal of the first unidirectional switch and a second terminal coupled to the second output terminal of the bridge rectifier, a first capacitor having a first terminal coupled to the first terminal of the second unidirectional switch and a second terminal, a converter circuit outputting a DC bus voltage and having a first input terminal coupled to the first terminal of the first unidirectional switch, a second input terminal coupled to the second output terminal of the bridge rectifier, a first output terminal coupled to the first terminal of the second unidirectional switch and a second output terminal, wherein the first and the second output terminals are coupled to the first capacitor in parallel, an EMI filter receiving the AC input voltage and coupled to the first and the second input terminals of the bridge rectifier in parallel, a DC/DC converter having a first and a second input terminals, and an output terminal outputting a DC output voltage, and a DC power source coupled to the storing and absorbing circuit, and having a first input terminal coupled to the second terminal of the second unidirectional switch, a second input terminal coupled to the second output terminal of the bridge rectifier, and an output terminal outputting a standby voltage, wherein the first capacitor is an output capacitor, the DC power source is a standby power source, and the first and the second input terminals of the DC/DC converter are respectively coupled to the first terminal of the second unidirectional switch and the second output terminal of the converter circuit, and receive the DC bus voltage, comprising the steps of:
- (a) causing the rectifier bridge to receive an AC input voltage of the converter system;
- (b) causing an input impulse signal flowing through the first unidirectional switch and the storing and absorbing circuit when the AC input voltage is the input impulse signal and exceeds an overvoltage threshold; and
- (c) providing an energy to the DC power source when the AC input voltage enters a power saving mode.

14. A method according to claim 13, wherein the step (b) further comprises the steps of:
- (b1) absorbing an impulse energy from the input impulse signal by the storing and absorbing circuit;
- (b2) clamping the rectified DC voltage at a first predetermined value; and
- (b3) clamping a voltage peak value of the power switch at a second predetermined value to avoid a damage of the power switch.

15. A method according to claim 14, wherein the converter circuit is one of a buck converter and a buck/boost converter.

16. A method according to claim 14, wherein the step (c) further comprises the steps of:
- (c1) providing an energy stored in the first capacitor to the DC power source via the second unidirectional switch when the AC input voltage enters a power saving mode; and
- (c2) keeping an output of the DC power source at a normal voltage for a predetermined time when the AC input voltage enters the power saving mode.

17. A method according to claim 14, wherein the step (c) further comprises the steps of:

(c1) providing a value of a DC bus voltage outputting from the converter circuit and a peak value of the rectified DC voltage; and (c2) causing a half of the peak value to be less than the value of the DC bus voltage such that the energy is provided by the rectified DC voltage when a value of the rectified DC voltage is no less than the value of the DC bus voltage and the energy is provided by the DC bus voltage when the value of the rectified DC voltage is smaller than the value of the DC bus voltage so as to avoid a peak current of an AC input current of the converter system to be appeared.

18. A method according to claim 17, wherein the storing and absorbing circuit is a second capacitor having first and second terminals.

19. A method according to claim 17, wherein the storing and absorbing circuit is a second auxiliary circuit and comprises a third, a fourth and a fifth unidirectional switches, each of which has a first terminal and a second terminal, a second and a third capacitors, each of which has first and second terminals, the second terminal of the fourth unidirectional switch is coupled to the first terminal of the third unidirectional switch, the first terminal of the fourth unidirectional switch is coupled to the second terminal of the fifth unidirectional switch, the second terminal of the third capacitor is coupled to the first terminal of the fourth unidirectional switch and the second terminal of the fifth unidirectional switch, the first terminal of the third capacitor is coupled to the second terminal of the third unidirectional switch, the first terminal of the fifth unidirectional switch is coupled to the second terminal of the second capacitor, and the first terminal of the second capacitor is coupled to the first terminal of the third unidirectional switch and the second terminal of the fourth unidirectional switch.

* * * * *